United States Patent
Jin et al.

(10) Patent No.: US 8,452,718 B2
(45) Date of Patent: May 28, 2013

(54) DETERMINATION OF TRAINING SET SIZE FOR A MACHINE LEARNING SYSTEM

(75) Inventors: Wen Jin, Fremont, CA (US); Vi Vuong, Fremont, CA (US); Walter Dean Mieher, Los Gatos, CA (US)

(73) Assignees: Tokyo Electron Limited, Tokyo (JP); KLA-Tencor Corporation, Milpitas, CA (US)

( * ) Notice: Subject to any disclaimer, the term of this patent is extended or adjusted under 35 U.S.C. 154(b) by 360 days.

(21) Appl. No.: 12/813,431

(22) Filed: Jun. 10, 2010

(65) Prior Publication Data

US 2011/0307424 A1    Dec. 15, 2011

(51) Int. Cl.
*G06F 15/18* (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| | | | | |
|---|---|---|---|---|
| 6,985,618 B2* | 1/2006 | Adel et al. | ..................... | 382/151 |
| 7,068,823 B2* | 6/2006 | Malik et al. | ................... | 382/124 |
| 7,177,457 B2* | 2/2007 | Adel et al. | ..................... | 382/144 |
| 7,181,057 B2* | 2/2007 | Adel et al. | ..................... | 382/144 |
| 7,274,814 B2* | 9/2007 | Ghinovker et al. | ........... | 382/144 |
| 7,317,824 B2* | 1/2008 | Ghinovker et al. | ........... | 382/144 |
| 7,467,064 B2* | 12/2008 | Vuong et al. | .................. | 702/181 |
| 8,170,833 B2* | 5/2012 | Vuong et al. | .................. | 702/181 |
| 8,330,281 B2* | 12/2012 | Ghinovker et al. | ........... | 257/797 |
| 8,346,506 B2* | 1/2013 | Vuong et al. | .................. | 702/181 |

* cited by examiner

*Primary Examiner* — Michael B Holmes
(74) *Attorney, Agent, or Firm* — Blakely, Sokoloff, Taylor & Zafman

(57) ABSTRACT

Automated determination of a number of profiles for a training data set to be used in training a machine learning system for generating target function information from modeled profile parameters. In one embodiment, a first principal component analysis (PCA) is performed on a training data set, and a second PCA is performed on a combined data set which includes the training data set and a test data set. A test data set estimate is generated based on the first PCA transform and the second PCA matrix. The size of error between the test data set and the test data set estimate is used to determine whether a number of profiles associated with the training data set is sufficiently large for training a machine learning system to generate a library of spectral information.

25 Claims, 8 Drawing Sheets

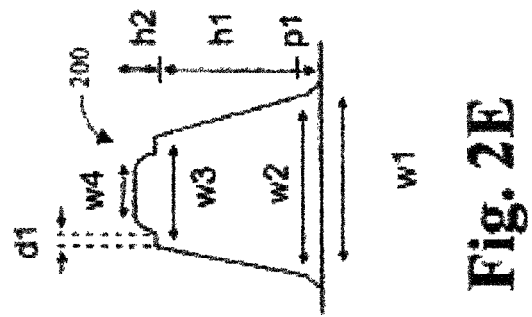
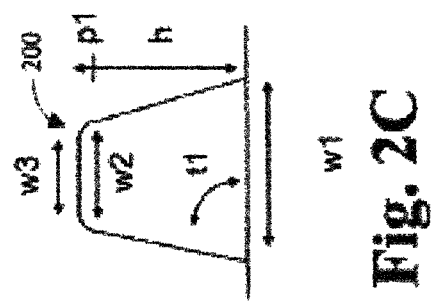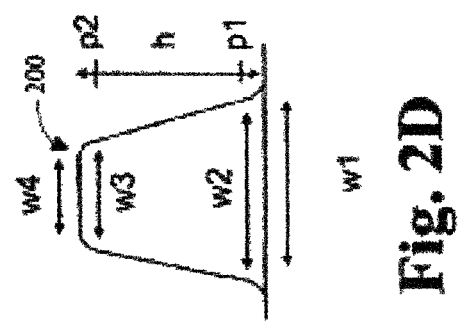
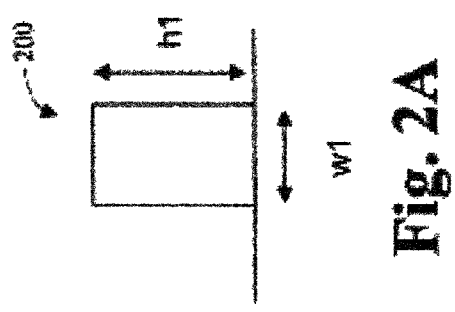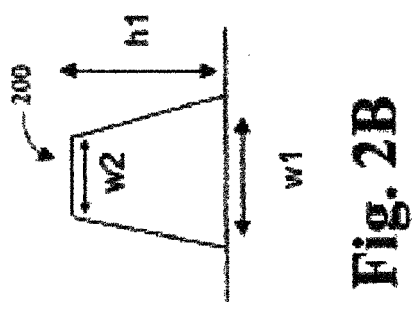

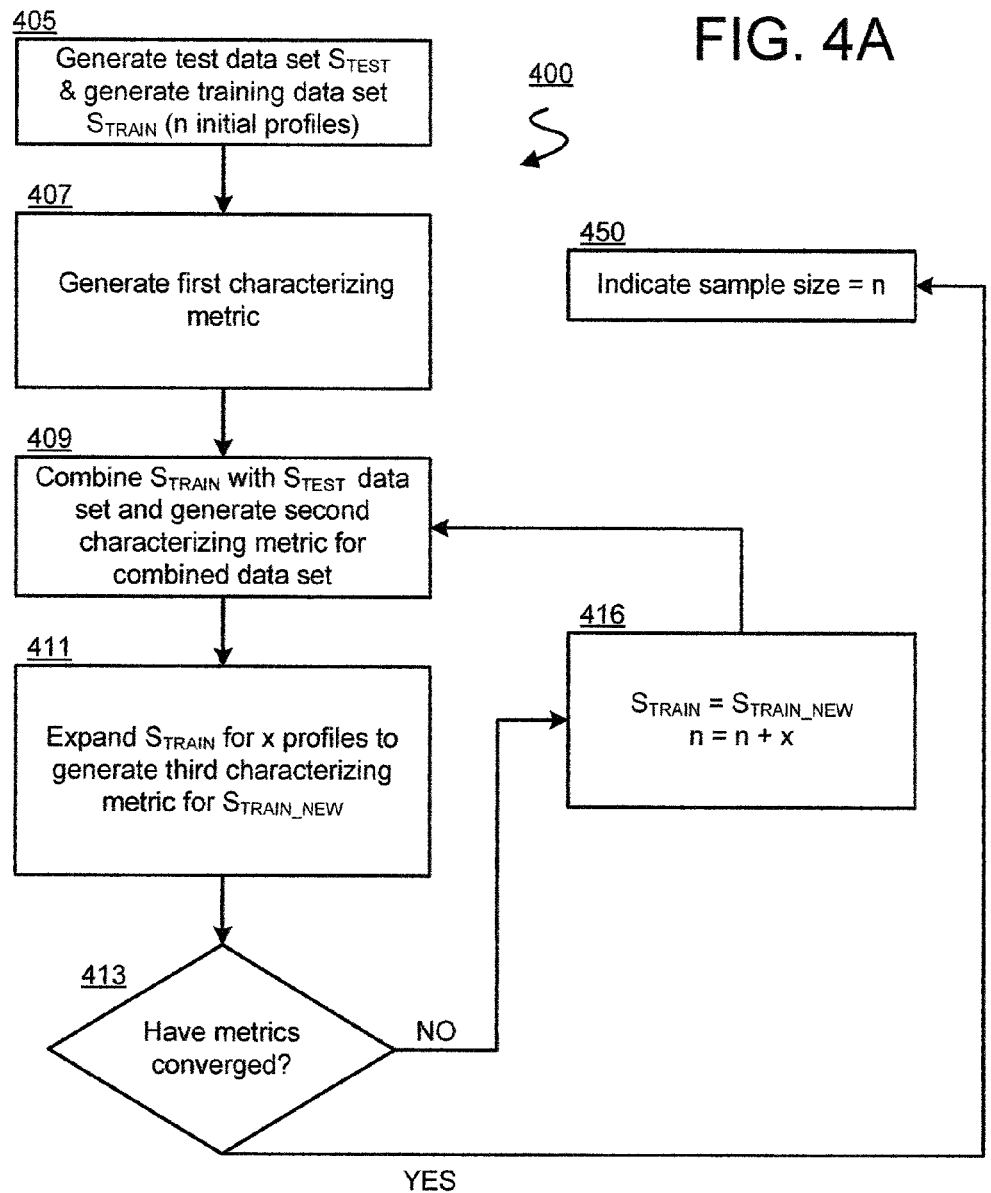

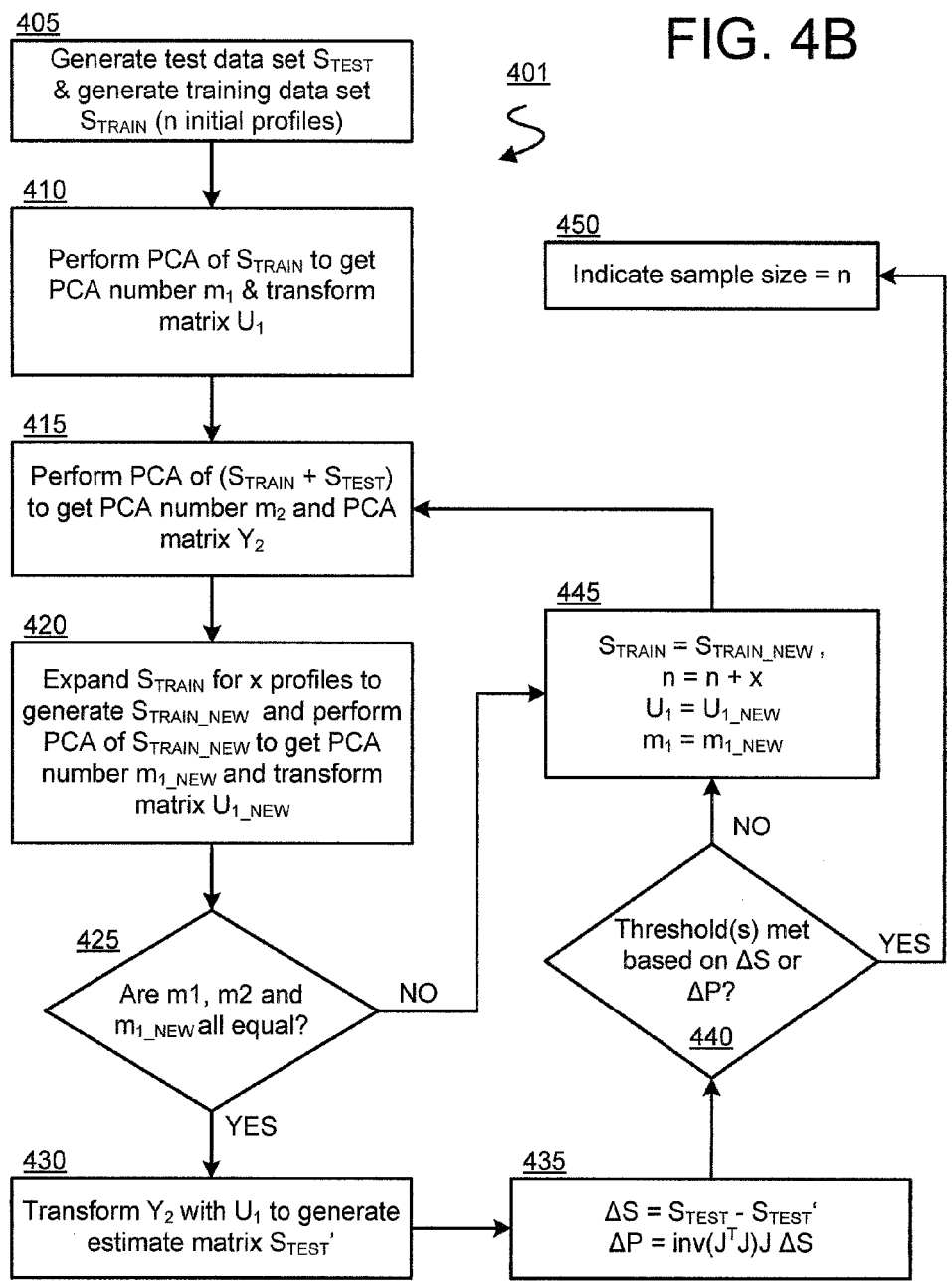

DETERMINATION OF TRAINING SET SIZE FOR A MACHINE LEARNING SYSTEM

TECHNICAL FIELD

Embodiments of the invention pertain to an automated sizing of a data set for training a machine learning system and more particularly pertain to methods and systems for an automated sizing of data set for training a neural network-based generator of a scatterometry library.

BACKGROUND

Optical metrology techniques generally referred to as scatterometry offer the potential to characterize parameters of a workpiece during a manufacturing process. In practice, light is directed onto a periodic grating formed in a workpiece and spectra of reflected light is measured and analyzed to characterize the grating parameters. Characterization parameters may include critical dimensions (CD), sidewall angle (SWA), feature height (HT), etc. which effect a material's reflectivity and refractive index. Characterization of the grating may thereby characterize the workpiece as well as a manufacturing process employed in the formation of the grating and the workpiece. For example, optical metrology system 100 depicted in FIG. 1A can be used to determine the profile of a grating 102 formed on a semiconductor wafer 104. Grating 102 can be formed in test areas on wafer 104, such as adjacent to a device formed on wafer 104. The optical metrology system 100 can include a photometric device with a source 106 and a detector 112. Grating 102 is illuminated by an incident beam 108 from source 106. In the present exemplary embodiment, incident beam 108 is directed onto grating 102 at an angle of incidence θi with respect to normal of grating 102 and an azimuth angle φ (i.e., the angle between the plane of incidence of beam 108 and the direction of the periodicity of grating 102). Diffracted beam 110 leaves at an angle of θd with respect to normal and is received by detector 112. Detector 112 converts the diffracted beam 110 into a measured metrology signal. To determine the profile of grating 102, optical metrology system 100 includes a processing module 114 configured to receive the measured metrology signal and analyze the measured metrology signal.

Analysis of measured spectra generally involves comparing the measured sample spectra to simulated spectra to deduce a model's parameter values that best describe the measured sample. FIG. 1B illustrates a method 100 for a building parameterized model and a spectra library beginning with sample spectra (e.g., originating from one or more workpieces). At operation 102, a set of material files are defined by a user to specify characteristics (e.g., n, k values) of the material(s) from which the measured sample feature is formed.

At operation 102, a scatterometry user defines a nominal model of the expected sample structure by selecting one or more of the material files to assemble a stack of materials corresponding to those present in the periodic grating features to be measured. This user-defined model may be further parameterized through definition of nominal values of model parameters, such as thicknesses, CD, SWA, HT, edge roughness, corner rounding radius, etc. which characterize the shape of the feature being measured. Depending on whether a 2D model (i.e., a profile) or 3D model is defined, it is not uncommon to have 30-50, or more, such model parameters.

From a parameterized model, simulated spectra for a given set of grating parameter values may be computed using rigorous diffraction modeling algorithms, such as Rigorous Coupled Wave Analysis (RCWA). Regression analysis is then performed at operation 106 until the parameterized model converges on a set of parameter values characterizing a final profile model (for 2D) that corresponds to a simulated spectrum which matches the measured diffraction spectra to a predefined matching criterion. The final profile model associated with the matching simulated diffraction signal is presumed to represent the actual profile of the structure from which the model was generated.

The matching simulated spectra and/or associated optimized profile model can then be utilized at operation 107 to generate a library of simulated diffraction spectra by perturbing the values of the parameterized final profile model. The resulting library of simulated diffraction spectra may then be employed by a scatterometry measurement system operating in a production environment to determine whether subsequently measured grating structures have been fabricated according to specifications.

Library generation 107 may include a machine learning system, such as a neural network, generating simulated spectral information for each of a number of profiles, each profile including a set of one or more modeled profile parameters. In order to generate the library, the machine learning system itself may have to undergo some training based on a training data set of spectral information. Such training may be computationally intensive and/or may have to be repeated for different models and/or profile parameter domains. Considerable inefficiency in the computational load of generating a library may be introduced by a user's decisions regarding the size of a training data set. For example, selection of an overly large training data set may result in unnecessary computations for training while training with a training data set of insufficient size may necessitate a retraining to generate a library.

An automated method for determining a size of a training data set would therefore be advantageous.

BRIEF DESCRIPTION OF THE DRAWINGS

The various embodiments of the present invention are illustrated by way of example, and not by way of limitation, in the figures of the accompanying drawings and in which:

FIGS. 2A through 2E depict exemplary profile models;

FIG. 4A is a sequence diagram illustrating select elements of a method according to an embodiment for determining a size of a training set for generating a library of spectral information;

FIG. 4B is a sequence diagram illustrating select elements of a method according to an embodiment for determining a size of a training set for generating a library of spectral information;

DETAILED DESCRIPTION

Figure 1A:
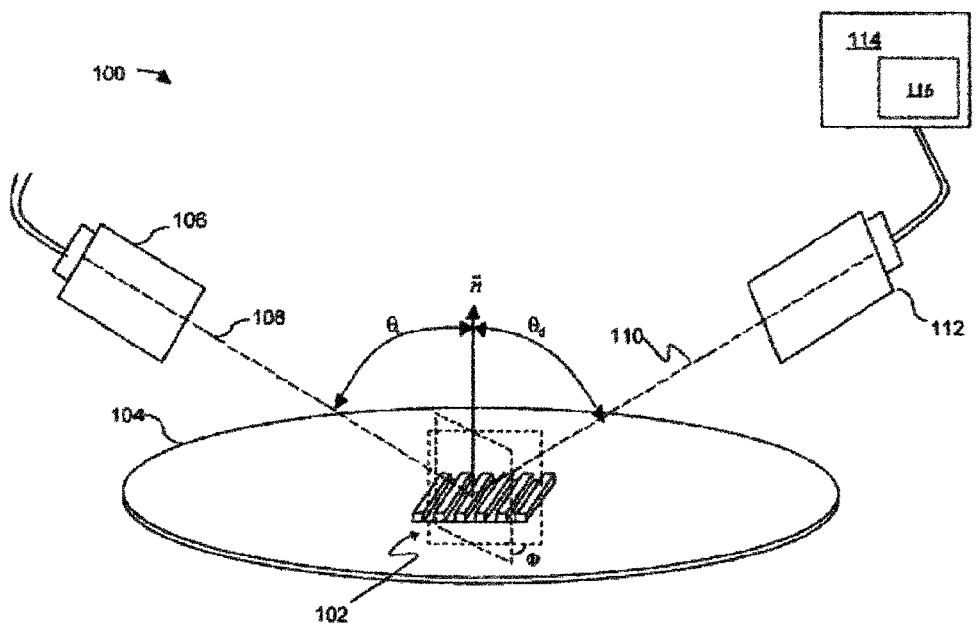
FIG. 1A depicts an exemplary optical metrology device for scatterometry.

In the following description, numerous details are set forth. It will be apparent, however, to one skilled in the art, that the present invention may be practiced without these specific details. For example, while the present methods are described in the context of scatterometry for diffraction grating parameter measurements, it should be appreciated that the methods may be readily adaptable to other contexts and applications by one of ordinary skill in the art.

In some instances, well-known methods and devices are shown in block diagram form, rather than in detail, to avoid obscuring the present invention. Reference throughout this specification to "an embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the two embodiments are not mutually exclusive.

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein include an automated determination of a training data set size to be used in training a machine learning system. Generally, the training data set is sized based on convergence of a data set characterization metric and may be further based on an estimate of the final solution error. The training data set is incrementally expanded and tested to identify convergence and, in certain embodiments, estimate the final solution error such a sample size will provide. The incremental expansion and testing is performed until a convergence criteria is met and/or the estimate of final solution error meets a threshold.

In a particular embodiment, a first principal component analysis (PCA) is performed on an initial training data set of a default sample size to generate a PCA transform matrix. A second PCA is performed on a combined data set which includes the initial training data set and a test data set. The number of samples in initial training data set is then incremented to generate an expanded training data set. A PCA of the expanded training data set is performed to determine if the PCA number for the expanded training data set is the same as for the initial training data set. If so, the error between the initial test data set and the expanded test data set is assessed based on the PCA signals and PCA transform matrix to estimate a final solution error. The PCA matrix of the combined data set is transformed back to the initial training data set domain (e.g., spectral domain) using the transform matrix from the first PCA to generate a test data set estimate. The method iterates with the size of the training matrix expanding until the PCA number converges and a final error target is achieved. Upon reaching the error target, the training data set of the identified size adequately represents the training target function information contained in the specified input parameter range. A machine learning system may then be trained with the training matrix of the identified size.

Because the training matrix sizing methods described herein do not require a separate training, a good training data sample set for neural network training is identified quickly, efficiently, and with good control of the final solution error. With the training data sample set identified, a machine learning system may then be trained to generate the desired target function information. In one particular embodiment, the machine learning system is trained to generate a library of simulated spectral information (e.g., diffraction signals) which may be utilized to deduce parameters of an unknown sample (e.g., diffraction grating or a wafer periodic structure) measured with a scratterometry system.

Figure 1B:
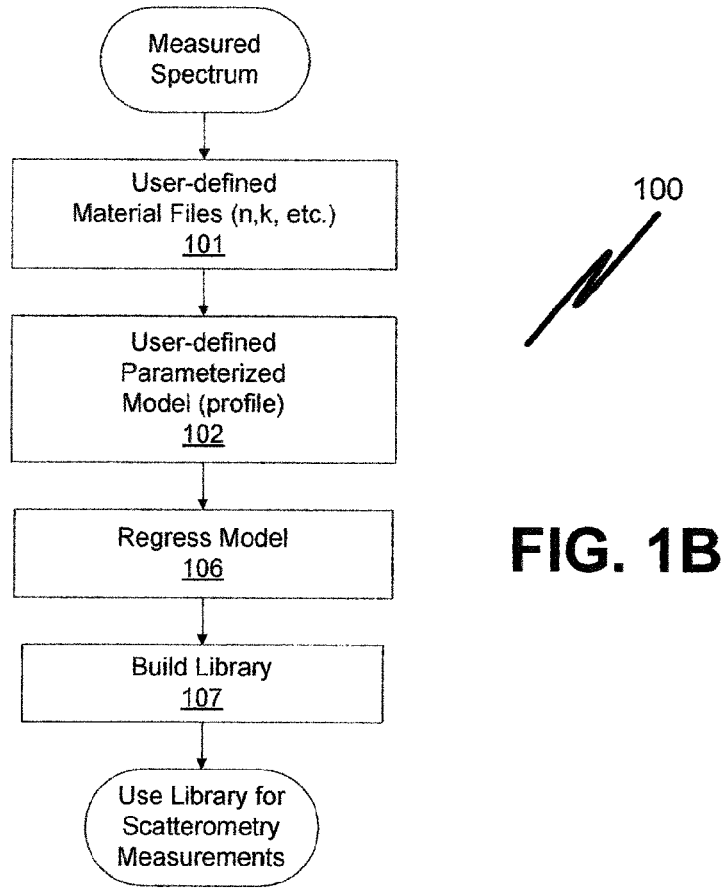
FIG. 1B is a flow diagram illustrating a conventional method for building a scatterometry model and a spectra library.

Referring to FIG. 1, to perform a measurement of an unknown sample (e.g., in a production environment), the processing module 114 receives a measured diffraction signal and analyzes the measured diffraction signal. A feature of periodic grating 102 can then be determined using a library-based process. In a library-based process, the measured diffraction signal is compared to a library of simulated diffraction signals. More specifically, each simulated diffraction signal in the library is associated with a profile model of the structure. When a match is made between the measured diffraction signal and one of the simulated diffraction signals in the library or when the difference of the measured diffraction signal and one of the simulated diffraction signals in the library is within a preset or matching criterion, the profile model associated with the matching simulated diffraction signal in the library is presumed to represent the actual profile of the structure. A feature of the structure can then be determined based on the profile model associated with the matching simulated diffraction signal.

Thus, in one exemplary embodiment, after obtaining a measured diffraction signal, processing module 114 compares the measured diffraction signal to simulated diffraction signals stored in a library 116. Each simulated diffraction signal in library 116 is associated with a profile model. When a match is made between the measured diffraction signal and one of the simulated diffraction signals in library 116, the profile model associated with the matching simulated diffraction signal in library 116 can be presumed to represent the actual profile of periodic grating 102.

The set of profile models stored in library 116 can be generated by characterizing a profile model using a set of profile parameters and then varying the set of profile parameters to generate profile models of varying shapes and dimensions. The process of characterizing a profile model using a set of profile parameters is referred to as parameterizing. For example, as depicted in FIG. 2A, assume that profile model 200 can be characterized by profile parameters h1 and w1 that define its height and width, respectively. As depicted in FIGS. 2B to 2E, additional shapes and features of profile model 200 can be characterized by increasing the number of profile parameters. For example, as depicted in FIG. 2B, profile model 200 can be characterized by profile parameters h1, w1, and w2 that define its height, bottom width, and top width, respectively. Note that the width of profile model 200 can be referred to as the critical dimension (CD). For example, in FIG. 2B, profile parameter w1 and w2 can be described as defining the bottom CD and top CD, respectively, of profile model 200. It should be recognized that various types of profile parameters can be used to characterize profile model 200, including angle of incidence (AOI), pitch, n & k, hardware parameters (e.g., polarizer angle), and the like.

As described above, the set of profile models stored in library 116 (FIG. 1) can be generated by varying the profile parameters that characterize the profile model. For example, with reference to FIG. 2B, by varying profile parameters h1, w1, and w2, profile models of varying shapes and dimensions can be generated. Note that one, two, or all three profile parameters can be varied relative to one another. As such, the profile parameters of the profile model associated with a matching simulated diffraction signal can be used to determine a feature of the structure being examined. For example, a profile parameter of the profile model corresponding to a bottom CD can be used to determine the bottom CD of the structure being examined.

Figure 3:
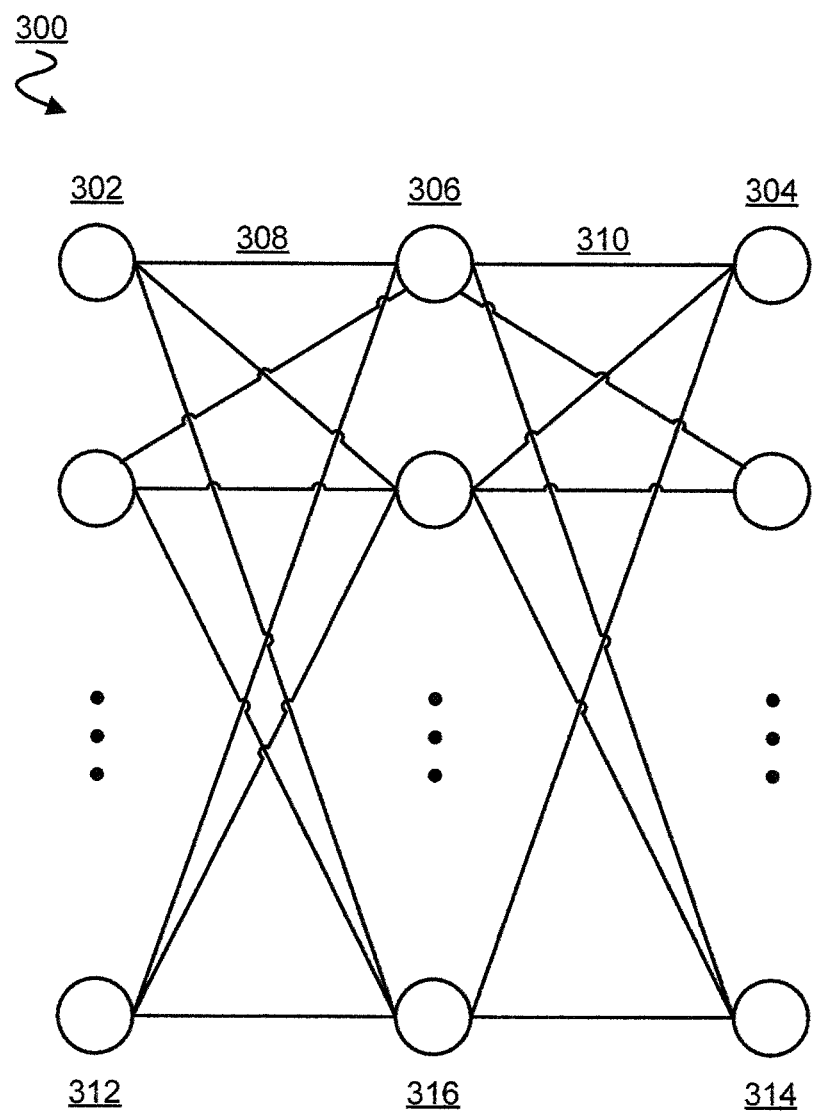
FIG. 3 depicts select elements of an exemplary neural network for generating a library of spectral information according to an embodiment.

FIG. 3 illustrates select elements of a machine learning system to be trained for generating a library of spectral information according to an embodiment. In one exemplary implementation, the machine learning system is a neural network 300 using a back-propagation algorithm. Neural network 300 includes an input layer 302, an output layer 304, and a hidden layer 306 between input layer 302 and output layer 304. Input layer 302 and hidden layer 306 are connected using links 308. Hidden layer 306 and output layer 304 are connected using links 310. It should be recognized, however, that neural network 300 can include any number of layers connected in various configurations commonly known in the neural network art.

As depicted in FIG. 3, input layer 302 includes one or more input nodes 312. In the present exemplary implementation, an input node 312 in input layer 302 corresponds to a profile parameter of the profile model that is inputted into neural network 300. Thus, the number of input nodes 312 corresponds to the number of profile parameters used to characterize the profile model. For example, if a profile model is characterized using two profile parameters (e.g., top and bottom critical dimensions), input layer 302 includes two input nodes 312, where a first input node 312 corresponds to a first profile parameter (e.g., a top critical dimension) and a second input node 312 corresponds to a second profile parameter (e.g., a bottom critical dimension).

In neural network 300, output layer 304 includes one or more output nodes 314. In the present exemplary implementation, each output node 314 is a linear function. It should be recognized, however, that each output node 314 can be various types of functions. Additionally, in the present exemplary implementation, an output node 314 in output layer 304 corresponds to a dimension of the simulated diffraction signal that is outputted from neural network 300. Thus, the number of output nodes 314 corresponds to the number of dimensions used to characterize the simulated diffraction signal. For example, if a simulated diffraction signal is characterized using five dimensions corresponding to, for example, five different wavelengths, output layer 304 includes five output nodes 314, wherein a first output node 314 corresponds to a first dimension (e.g., a first wavelength), a second output node 314 corresponds to a second dimension (e.g., a second wavelength), etc. Additionally, for increased performance, neural network 300 can be separated into a plurality of sub networks based on separate components of the simulated diffraction signal and/or dimensions of the components of the simulated diffraction signal.

In neural network 300, hidden layer 306 includes one or more hidden nodes 316. In the present exemplary implementation, each hidden node 316 is a sigmoidal transfer function or a radial basis function. It should be recognized, however, that each hidden node 316 can be various types of functions. Additionally, in the present exemplary implementation, the number of hidden nodes 316 is determined based on the number of output nodes 314. More particularly, the number of hidden nodes $316(m)$ is related to the number of output nodes $314(n)$ by a predetermined ratio (r=m/n). For example, when r=10, there are 10 hidden nodes 316 for each output node 314. It should be recognized, however, that the predetermined ratio can be a ratio of the number of output nodes 314 to the number of hidden nodes 316 (i.e., r=n/m). Additionally, it should be recognized that the number of hidden nodes 316 in neural network 300 can be adjusted after the initial number of hidden nodes 316 is determined based on the predetermined ratio. Furthermore, the number of hidden nodes 316 in neural network 300 can be determined based on experience and/or experimentation rather than based on the predetermined ratio.

FIGS. 4A and 4B illustrate select elements of methods 400 and 401 to determine a size of a training data set to be used in training a machine learning system. The method 401 is an exemplary embodiment of the more general method 400. In the exemplary embodiments described with reference to FIGS. 4A and 4B, the target function information is simulated spectral information from modeled diffraction grating profile parameters. However, it should be appreciated that training of a machine learning system, such as the neural network 300, is a problem which is confronted across many disciplines and therefore the sizing of a training data set, as described herein, is applicable to many contexts beyond that of scatterometry, such as for pattern identification applications (speech recognition and the like). As such, while the scatterometry application serves as the illustrative implementation in the description herein, the training set sizing techniques described are application agnostic.

The methods 400 (FIG. 4A) and 401 (FIG. 4B) both include generating, at operation 405, a test data set $S_{TEST}$, such as spectral information for each of a set of profiles. In one such embodiment, $S_{TEST}$ includes a rigorously computed diffraction signal for one or more wavelengths for each of the set of sample profiles. The rigorous computation may be performed, as previously described, via RCWA or another rigorous computation technique known in the art. The profiles for $S_{TEST}$ may each include a number of profile parameters, e.g. where the profile parameters of all of the profiles reside within a parameter space data matrix X.

Also at operation 405, a training data set $S_{TRAIN}$ is generated which includes spectral information for each of n sample profiles. In one such embodiment, $S_{TRAIN}$ includes a rigorously computed diffraction signal for one or more wavelengths for each of the n profiles. $S_{TRAIN}$ may span the same parameter space as $S_{TEST}$ and the rigorous computation may be performed by RCWA in the same manner as for $S_{TEST}$. The number of profiles n for $S_{TRAIN}$ has some initial value corresponding to a minimum training data set size, which may be user definable, from which the training data $S_{TRAIN}$ may be expanded to include additional profiles during the methods 400 and 401. In one exemplary embodiment, the initial training data set is approximately 1000 samples, although significant more or less may be chosen as dependent on the sample space, design of the neural network, etc.

Next, at operation 407, a first characterizing metric is determined for the training data set $S_{TRAIN}$. The characterizing metric is to be one which will provide a basis for a convergence determination as the size of the training state set $S_{TRAIN}$ is increased. Depending on the embodiment, the characterizing metric may be a PCA number generated by performing a principal component analysis (PCA), a reduced dimension number generated by performing a non-linear dimensionality reduction analysis, or a cluster number generated by performing a K-means clustering analysis. In the exemplary embodiment further illustrated in FIG. 4B, a principal component analysis (PCA) of $_{STRAIN}$ is performed at operation 410. By way of illustration, performing PCA of $_{STRAIN}$ may include calculating:

$$Y_1 = U_1^T S_{TRAIN} = \Sigma_1^T V_1^T = \Sigma_1 V_1^T,$$

where $U_1 \Sigma_1 V_1$ is the singular value decomposition (svd) of $S_{TRAIN}$. The columns of $V_1$ may form a set of orthonormal "input" or "analysing" basis vector directions for $Y_1$—i.e. the eigenvectors of $(Y_1^* Y_1)$. The columns of $U_1$ may form a set of orthonormal "output" basis vector directions for $Y_1$—i.e. the eigenvectors of $(Y_1 Y_1^*)$. The diagonal values in matrix $\Sigma_1$ are the singular values—e.g. the square roots of the eigenvalues of $(Y_1 Y_1^*)$ and $(Y_1^* Y_1)$ that correspond with the same columns in $U_1$ and $V_1$. From the PCA of $S_{TRAIN}$, the transform matrix $U_1$ may be determined, as well as PCA number $m_1$, a number of independent basis vectors for $U_1$. It is noted that $U_1$ may be calculated as an orthogonal matrix of singular vectors—e.g. the eigenvectors of covariance matrix $C = S_{TRAIN} S_{TRAIN}^T$.

Returning back to FIG. 4A, at operation 409, the training data set $S_{TRAIN}$ and the test data set $S_{TEST}$ is combined to form a combined data set $(S_{TRAIN} + S_{TEST})$ and a characterizing metric is generated for the combined data set. Here again, depending on the embodiment, the characterizing metric may be a PCA number generated by performing a principal component analysis (PCA), a reduced dimension number generated by performing a non-linear dimensionality reduction analysis, or a cluster number generated by performing a K-means clustering analysis. In the exemplary embodiment further illustrated in FIG. 4B, at operation 415, a PCA is performed for a combined data set including both the training data set and the test data set $(S_{TRAIN} + S_{TEST})$. In one such embodiment, PCA of $(S_{TRAIN} + S_{TEST})$ includes calculating:

$$Y_2 = U_2^T (S_{TRAIN} + S_{TEST}) = \Sigma_2^T V_2^T = \Sigma_2 V_2^T,$$

where $U_2 \Sigma_2 V_2$ is the svd of $(S_{TRAIN} + S_{TEST})$. More particularly, columns of $V_2$ may form the eigenvectors of $(Y_2^* Y_2)$, columns of $U_2$ may form the eigenvectors of $(Y_2 Y_2^*)$ and diagonal values in matrix $\Sigma_2$ are the square roots of the eigenvalues of $(Y_2 Y_2^*)$ and $(Y_2^* Y_2)$ that correspond with the same columns in $U_2$ and $V_2$. From the PCA of $(S_{TRAIN} + S_{TEST})$, the PCA matrix $Y_2$ may be determined, as well as PCA number $m_2$, a number of independent basis vectors for $U_2$.

Generation of the characterization metric for the combined data set (operations 409/415) may be a first of a series of operations which are to be iteratively performed in the methods 400/401. For example, while the PCA for $(S_{TRAIN} + S_{TEST})$ at operation 415 may first be performed for the initial $S_{TRAIN}$, operation 415 may further be the first of a series of operations which are to be iteratively performed in method 400. The method 401 may further include performing a subsequent PCA for an updated combined data set $(S_{TRAIN} + S_{TEST})$ which combines the test data set $S_{TEST}$ with a training data set $S_{TRAIN}$ that had been expanded to include more profiles than included in a previous iteration (e.g., more than the 1000 profiles provided at operation 405).

Referring back to FIG. 4A, at operation 411, the training data set $S_{TRAIN}$ is expanded to generate $S_{TRAIN\_NEW}$ containing additional training data. For example, spectral information for x additional profiles may be added to $S_{TRAIN}$. In one such embodiment, the expansion is approximately 20% of the initial training sample size (200 samples where the initial training set includes 1000 samples). The characterizing metric is then generated for this expanded training data set $S_{TRAIN\_NEW}$. Again, depending on the embodiment, this characterizing metric may a PCA number generated by performing a principal component analysis (PCA), a reduced dimension number generated by performing a non-linear dimensionality reduction analysis, or a cluster number generated by performing a K-means clustering analysis. In the exemplary embodiment further illustrated in FIG. 4B, at operation 420, a PCA of the expanded training data set $S_{TRAIN\_NEW}$ is performed, for example, by calculating:

$$Y_{1\_NEW} = U_{1\_NEW}^T S_{TRAIN\_NEW} = \Sigma_{1\_NEW} V_{1\_NEW}^T,$$

where $U_{1\_NEW} \Sigma_{1\_NEW} V_{1\_NEW}$ is the singular value decomposition (svd) of $S_{TRAIN\_NEW}$. From the PCA of $S_{TRAIN\_NEW}$, the transform matrix $U_{1\_NEW}$ may be determined as well as PCA number $m_{1\_NEW}$ (a number of independent basis vectors for $U_{1\_NEW}$).

Referring back to FIG. 4A, at operation 413, a determination is made whether the characterizing metric has converged such that a current iteration of the training set (e.g., expanded training data set $S_{TRAIN\_NEW}$) is within some predetermined threshold criteria of the metric generated for the combined data set $(S_{TRAIN} + S_{TEST})$, then the method proceeds to define the machine learning training data set size at operation 450. For example, for a non-linear dimensionality reduction embodiment, if the reduced dimension number converges (e.g., remains constant) with additional sample data, then method 400 proceeds to operation 450 and the final sample size for the machine learning training is set to $S_{TRAIN}$. Similarly, for a K-means clustering embodiment, if the cluster number converges with additional sample data, then method 400 proceeds to operation 450 and the final sample size for the machine learning training is set to $S_{TRAIN}$. Where convergence is not achieved, then the method 400 proceeds to operation 416 and another iteration of the operations 409-413 is performed with $S_{TRAIN}$ updated to included the expanded number of samples $(S_{TRAIN\_NEW})$. In this manner the method 400 proceeds to incrementally expand the size of the training set $S_{TRAIN}$ until the characterization metric converges.

Referring now in more detail for the exemplary PCA embodiment illustrated in FIG. 4B, at operation 425, a determination is made whether the PCA number for the training set has converged such that a current iteration of the training set (e.g., expanded training data set $S_{TRAIN\_NEW}$) has the same PCA number as the combined data set $(S_{TRAIN} + S_{TEST})$. In a further embodiment, convergence is determined upon the PCA numbers $m_1$, $m_2$ and $m_{1\_NEW}$ being equal for a particular fraction number (e.g., $1e^{-3} - 1e^{-9}$). If $m_1$, $m_2$ and $m_{1\_NEW}$ are not all equal under the same pre-selected PCA fraction number, then the method 401 proceeds to operation 445 and another iteration of the operations 415-430, starting at 415 is performed with values of $S_{TRAIN}$, $U_1$ and $m_1$ updated. For example, at operation 445, $S_{TRAIN}$ may be set to the most recent $S_{TRAIN\_NEW}$, the current number of profiles n may be set to the most recent expanded number (n+x), and $U_1$ may be set to the most recent $U_{1\_NEW}$. In this manner the method 401 proceeds to incrementally expand the size of the training set $S_{TRAIN}$ until the PCA number converges.

If it is determined at operation 425 that the PCA number has converged (e.g., that $m_1$, $m_2$ and $m_{1\_NEW}$ are equal) the PCA matrix $Y_2$ is transformed at operation 430 with the transform matrix $U_1$ to generate a test data set estimate $S_{TEST}'$ so that an accuracy metric of the training data set may further be utilized to determine the proper size of the training data set. This ability of the exemplary PCA embodiment to further include an accuracy threshold may provide certain advantages over other embodiments (e.g., K-means clustering and non-linear dimensionality reduction embodiments). For example, in one PCA embodiment, a combined data set estimate $(S_{TRAIN}'+S_{TEST}')$ is calculated as follows:

$$U_1 Y_2 = S_{TRAIN}' + S_{TEST}'$$

Thus, where the training data set includes spectral information, the combined data set estimate $(S_{TRAIN}'+S_{TEST}')$ includes a test data set estimate $S_{TEST}'$ corresponding to $S_{TEST}$, where the test data set estimate $S_{TEST}'$ is in the spectrum domain (i.e., a spectral signal matrix). At operation 435 a spectral domain error $\Delta S$ is calculated to evaluate the effect the current size of $S_{TRAIN}$ has on spectral error. In one exemplary embodiment, $\Delta S$ is calculated as:

$$\Delta S = S_{TEST} - S_{TEST}'$$

In another embodiment, the spectral domain error $\Delta S$ is converted into a profile domain error $\Delta P$ for each parameter. In one such embodiment, for example, $\Delta P$ is determined as:

$$\Delta P = \text{inv}(J^T J) J \Delta S$$

where J is the Jacobian of $S_{TEST}$ as calculated at each test point or a center point of the parameter space X which provides a sensitivity measure of the spectral information with respect to the parameters of each profile.

Based on the calculated $\Delta S$, it is determined, at operation 440, whether one or more threshold values have been met. Generally, the meeting of such thresholds indicates whether a marginal increase in the training data set size above the current profile number n would provide benefits which are too small to offset the attendant increase in computational load of a larger training data set. More specifically, where the n sample PCA transform matrix can recover the combined sample spectrum from the PCA domain with sufficient accuracy, the training set size is deemed sufficiently large. In one embodiment, at operation 440, $\Delta S$ is compared to a threshold value $\epsilon$, in the spectral domain.

Embodiments which additionally or alternatively provide for the error thresholding in terms of the parameter space, $\Delta P$ may provide a more intuitive basis for a user to control the automated selection of a training matrix size. In a particular embodiment, an average of the profile error $\Delta P$ is compared, at operation 440, against a precision value pre1 in each parameter dimension. The precision pre1 may be determined by any method known in the art. In one such embodiment, the method 401 proceeds to operation 450 if the average of the profile error $\Delta P$ is less than a constant, such as 0.5, multiplied with the parameter precision pre1. For example, where a profile includes parameters p1, p2, and p3, the method 401 proceeds to operation 450 where the average of the profile error $\Delta P$ is less than a constant (e.g., 0.5) multiplied with the precision pre1 determined for each of parameters p1, p2, and p3. Alternatively, or in addition, at operation 440 the determination of whether one or more threshold values have been exceeded may include determining whether the standard deviation the profile error $\Delta P$ is equal to or less than the parameter precision pre1 in each dimension multiplied by another constant, such as 1.5.

Upon determining that the one or more threshold values have not been met, then another iteration of the operations starting at 415 is to be performed, with the training set $S_{TRAIN}$ increased to be the expanded data set $S_{TRAIN\_NEW}$. $U_1$ and $m_1$ are similarly updated at 445.

Upon determining that the one or more threshold values have been met, then the current value of the number of profiles n of the training data set $S_{TRAIN}$ are to be the number of profiles to be used for training a machine learning system to generate a library. The method 401 proceeds to provide an output at operation 450, to indicate a sample size of n profiles is to be used for training.

Figure 5:
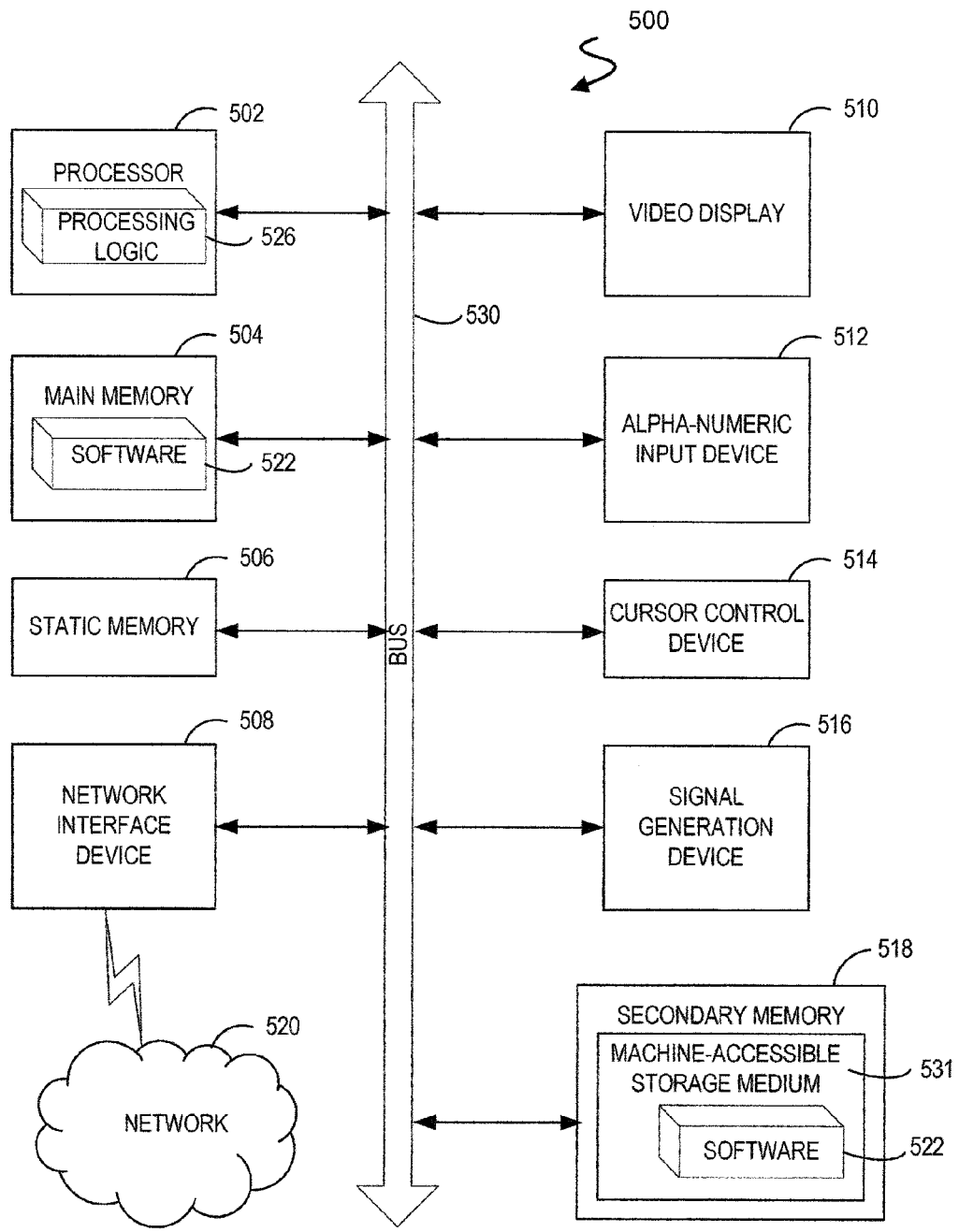
FIG. 5 illustrates a block diagram of an exemplary computer system, in accordance with an embodiment.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-accessible storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface device 508.

The machine-accessible storage medium 531 may also be used to store or train a neural network, and/or a software library containing methods that train or call a neural network meta-model and/or a user interface of the neural network meta-model. In an embodiment, machine-accessible storage medium 531 may be used to configure the processor 502 to determine a size of a training data set to be used in training a neural network to generate a library of spectral information. Determining a size of a training data set may include determining a total number of profiles for the training data set.

The machine-accessible storage medium 531 may further be used to store one or more additional components. While the machine-accessible storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical, magnetic and other similar non-transitory media.

Figure 6:
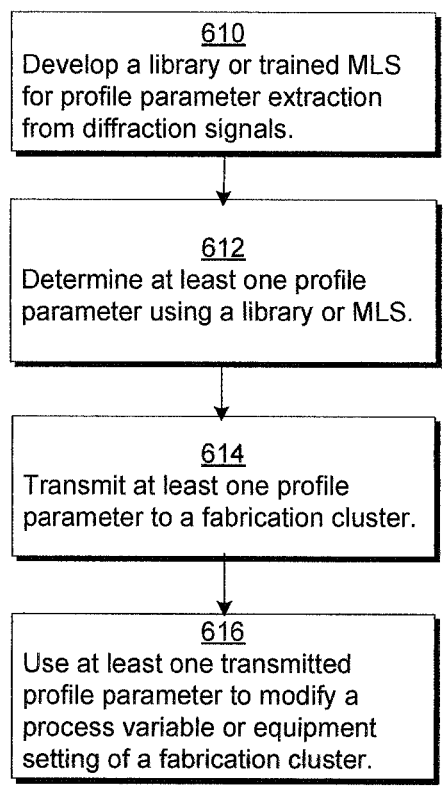
FIG. 6 is a flow diagram illustrating an exemplary method for determining and utilizing profile parameters for automated process and equipment control, in accordance with one embodiment.

FIG. 6 is an exemplary flowchart for determining and utilizing profile parameters for automated process and equipment control. In step 610, a library and/or trained MLS are developed to extract profile parameters from the measured diffraction signals. In step 612, at least one profile parameter of a structure is determined using the library or the trained MLS. In step 614, the at least one profile parameter is transmitted to a fabrication cluster configured to perform a processing step, where the processing step may be executed in the semiconductor manufacturing process flow either before or after measurement step 612 is made. In step 616, the at least one transmitted profile parameter is used to modify a process variable or equipment setting for the processing step performed by the fabrication cluster.

Figure 7:
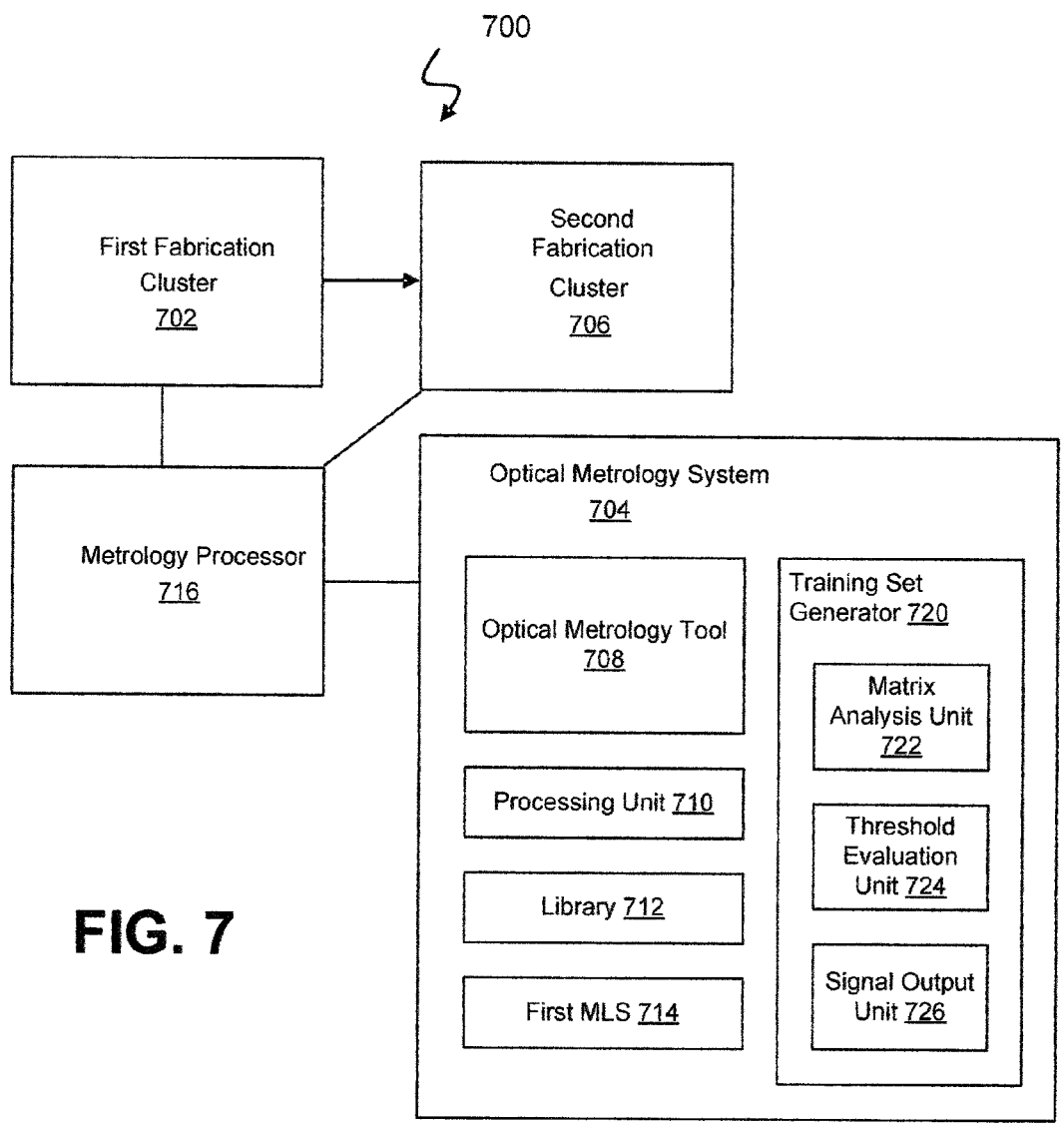
FIG. 7 is a block diagram illustrating select elements of a system according to an embodiment for determining and utilizing profile parameters for automated process and equipment control.

FIG. 7 is an exemplary block diagram of a system for determining and utilizing profile parameters for automated process and equipment control. System 700 includes a first fabrication cluster 702 and optical metrology system 704. System 700 also includes a second fabrication cluster 706. Although the second fabrication cluster 706 is depicted in FIG. 7 as being subsequent to first fabrication cluster 702, it should be recognized that second fabrication cluster 706 can be located prior to first fabrication cluster 702 in system 700 (e.g. and in the manufacturing process flow).

A photolithographic process, such as exposing and/or developing a photoresist layer applied to a wafer, can be performed using first fabrication cluster 702. In one exemplary embodiment, optical metrology system 704 includes an optical metrology tool 708 and processor 710. Optical metrology tool 708 is configured to measure a diffraction signal off of the structure. If the measured diffraction signal and the simulated diffraction signal match, one or more values of the profile parameters are presumed equal the one or more values of the profile parameters associated with the simulated diffraction signal.

In one exemplary embodiment, optical metrology system 704 can also include a library 712 with a plurality of simulated (i.e. calculated) diffraction signals and a plurality of values of one or more profile parameters associated with the plurality of simulated diffraction signals. As described above, a first MLS 714 may be trained to generate the library 712. For example, optical metrology system 704 may include a training set generator 720 to provide a set of training data to the first MLS 714. In an embodiment, the training set data may include spectral information for a set of modeled profiles, each profile including a set of profile parameters. The training set generator 720 may automatically generate or otherwise determine, according to techniques and algorithms described herein, the number of profiles to be used as the training set data.

In an embodiment, training set generator 720 may include a matrix analysis unit 722 having any of a variety of hardware and/or software means to perform some or all of the principle component analysis described herein. Performing PCA of method 400, for example, may include matrix analysis unit 722 generating or otherwise determining some or all of $S_{TEST}$, $S_{TRAIN}$, the combined data set ($S_{TRAIN}+S_{TEST}$), $S_{TEST}$, and $S_{TRAIN\_NEW}$.

In an embodiment, training set generator 720 further includes a threshold evaluation unit 724 to determine whether one or more threshold values have been met. Threshold evaluation unit 724 may thereby determine whether a marginal increase in a training data set size above a current profile number n would provide benefits which are too small to offset the attendant increase in computational load of a larger training data set. Determining whether such threshold are met may include generating or otherwise determining $\Delta S$ and/or $\Delta P$.

Based on the determinations of training set generator 720, a signal output unit 726 of training set generator 720 may provide a signal indicating that a sample size of n profiles is to be used for training first MLS 714, where n is to be equal to the current number of profiles for the training data set $S_{TRAIN}$. In an embodiment, a message from signal output unit 726 may be provided to other elements of training set generator 720 which generate a sample set for training first MLS 714.

Metrology processor 710 can compare a measured diffraction signal of a structure to the plurality of simulated diffraction signals in the library. When a matching simulated diffraction signal is found, the one or more values of the profile parameters associated with the matching simulated diffraction signal in the library is assumed to be the one or more values of the profile parameters characterizing the measured structure.

System 700 also includes a metrology processor 716. In one exemplary embodiment, processor 710 can transmit the one or more values of the one or more profile parameters to metrology processor 716. Metrology processor 716 can then adjust one or more process parameters or equipment settings of first fabrication cluster 702 based on the one or more values of the one or more profile parameters determined using optical metrology system 704. Metrology processor 716 can also adjust one or more process parameters or equipment settings of the second fabrication cluster 706 based on the one or more values of the one or more profile parameters determined using optical metrology system 704. As noted above, fabrication cluster 706 can process the wafer before or after fabrication cluster 702.

Techniques and architectures for optical metrology are described herein. In the description herein, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Some portions of the detailed descriptions herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method of determining a number of profiles for a training data set to be used in training a machine learning system to generate simulated spectral information from modeled profile parameters, the method comprising:
   generating a first characterizing metric for a training data set with a first number of profiles;
   expanding the first training data set to include a second number of profiles greater than the first number of profiles;
   generating a second characterizing metric for the expanded training data set; and
   defining the number of profiles for training the machine learning system to include the first number of profiles in response to the first and second characterizing metrics converging within a predetermined threshold.

2. The method of claim 1, wherein generating the characterizing metrics further comprises performing at least one of principal component analysis (PCA), non-linear dimensionality reduction, or K-means clustering, and wherein the characterizing metric is one of: a PCA number, cluster number, or reduced dimension number.

3. The method of claim 1, wherein generating the first characterizing metric further comprises performing a first PCA of the training data set with the first number of profiles to determine a first training set PCA number and a first training set PCA transform; and wherein generating the second characterizing metric further comprises performing a PCA of the expanded training set to determine an expanded training set PCA number.

4. The method of claim 3, wherein the training data set is set equal to the expanded training data set in response to the first training set PCA number being unequal to the expanded training set PCA number.

5. The method of claim 3, further comprising:
   appending the training data set to a test data set with a third number of profiles to form a combined data set;
   performing a PCA of the combined data set to determine a combined set PCA number and a combined set PCA matrix;
   transforming the combined set PCA matrix with the first training set PCA transform to generate a test data set estimate; and
   defining the number of profiles for training the machine learning system to include the first number of profiles in response to the test data set estimate matching the test data set to an accuracy threshold.

6. The method of claim 5, further comprising:
   determining a spectral domain error between the test data set estimate and the test data set; and
   evaluating based on the spectral domain error whether the test data set estimate matches the test data set to the accuracy threshold.

7. The method of claim 6, further comprising converting the spectral domain error into a profile domain error.

8. The method of claim 7, wherein converting the spectral domain error into the profile domain error is based on a Jacobian of the test data set.

9. The method of claim 7, wherein evaluating based on the spectral domain error whether the test data set matches the test data set estimate to the accuracy threshold includes determining whether a mean profile domain error is less than a precision value for a profile parameter.

10. The method of claim 7, wherein evaluating based on the spectral domain error whether the test data set matches the test data set estimate to the accuracy threshold includes determining whether a standard deviation value for the profile domain error is less than a second precision value.

11. A non-transitory machine-accessible storage medium having instructions stored thereon which cause a data processing system to perform a method of determining a number of profiles for a training data set to be used in training a machine learning system to generate simulated spectral information from modeled profile parameters, the method comprising:
    performing a first principal component analysis (PCA) of a training data set with a first number of profiles to determine a first training set PCA number and a first training set PCA transform;
    appending the training data set to a test data set with a second number of profiles to form a combined data set;
    performing a second PCA of the combined data set to determine a combined set PCA number and a combined set PCA matrix;
    transforming the combined set PCA matrix with the first training set PCA transform to generate a test data set estimate; and
    defining the number of profiles for training the machine learning system to include the first number of profiles in response to the test data set estimate matching the test data set to an accuracy threshold.

12. The machine-accessible storage medium of claim 11, the method further comprising:
    determining a spectral domain error between the test data set estimate and the test data set; and
    evaluating based on the spectral domain error whether the test data set estimate matches the test data set to the accuracy threshold.

13. The machine-accessible storage medium of claim 12, the method further comprising converting the spectral domain error into a profile domain error.

14. The machine-accessible storage medium of claim 13 wherein converting the spectral domain error into the profile domain error is based on a Jacobian of the test data set.

15. The machine-accessible storage medium of claim 13, wherein evaluating based on the spectral domain error whether the test data set matches the test data set estimate to the accuracy threshold includes determining whether a mean profile domain error is less than a precision value for a profile parameter.

16. The machine-accessible storage medium of claim 13, wherein evaluating based on the spectral domain error whether the test data set matches the test data set estimate to the accuracy threshold includes determining whether a standard deviation value for the profile domain error is less than a second precision value.

17. The machine-accessible storage medium of claim 11 wherein one of the first PCA, the second PCA and the third PCA is based on a singular value decomposition of a data set.

18. An optical metrology system to determine a number of profiles for a training data set used in training a machine learning system to generate simulated spectral information from modeled profile parameters, the optical metrology system comprising:
    a processor to generate a first characterizing metric for a training data set with a first number of profiles;
    the processor further to expand the first training data set to include a second number of profiles greater than the first number of profiles and to generate a second characterizing metric for the expanded training data set; and
    the processor to define a number of profiles for training the machine learning system to include the first number of profiles in response to the first and second characterizing metrics converging within a predetermined threshold.

19. The optical metrology system of claim 18, wherein the processor is to generate the characterizing metrics by performing at least one of principal component analysis (PCA), nonlinear dimensionality reduction, or K-means clustering, and wherein the characterizing metric generate is one of: a PCA number, cluster number, or reduced dimension number.

20. The optical metrology system of claim 18, wherein the processor is to generate the first characterizing metric by performing a first PCA of the training data set with the first number of profiles to determine a first training set PCA number and a first training set PCA transform; and wherein the processor is to generate the second characterizing metric by performing a PCA of the expanded training set to determine an expanded training set PCA number; and wherein the processor is to:
    append the training data set to a test data set with a third number of profiles to form a combined data set;
    perform a PCA of the combined data set to determine a combined set PCA number and a combined set PCA matrix;
    transform the combined set PCA matrix with the first training set PCA transform to generate a test data set estimate; and
    define the number of profiles for training the machine learning system to include the first number of profiles in response to the test data set estimate matching the test data set to an accuracy threshold.

21. The optical metrology system of claim 20, wherein the determining whether the test data set matches the test data set estimate to an accuracy threshold is based on a spectral domain error between the test data set and the test data set estimate.

22. The optical metrology system of claim 21, wherein determining based on the spectral domain error whether the test data set matches the test data set estimate to an accuracy threshold includes converting the spectral domain error into a profile domain error.

23. The optical metrology system of claim 22, wherein converting the spectral domain error into the profile domain error is based on a Jacobian of the test data set.

24. The optical metrology system of claim 22, wherein evaluating based on the spectral domain error whether the test data set matches the test data set estimate to the accuracy threshold includes determining whether a mean profile domain error is less than or equal to a first precision value for a profile parameter.

25. The optical metrology system of claim 22, wherein evaluating based on the spectral domain error whether the test data set matches the test data set estimate to the accuracy threshold includes determining whether a standard deviation value for the profile domain error is less than a second precision value.

* * * * *